Jan. 7, 1969 J. MARTIN 3,420,651
ROLL BEARING STRUCTURES FOR GLASS MAKING MACHINES
Filed June 7, 1965 Sheet 1 of 4
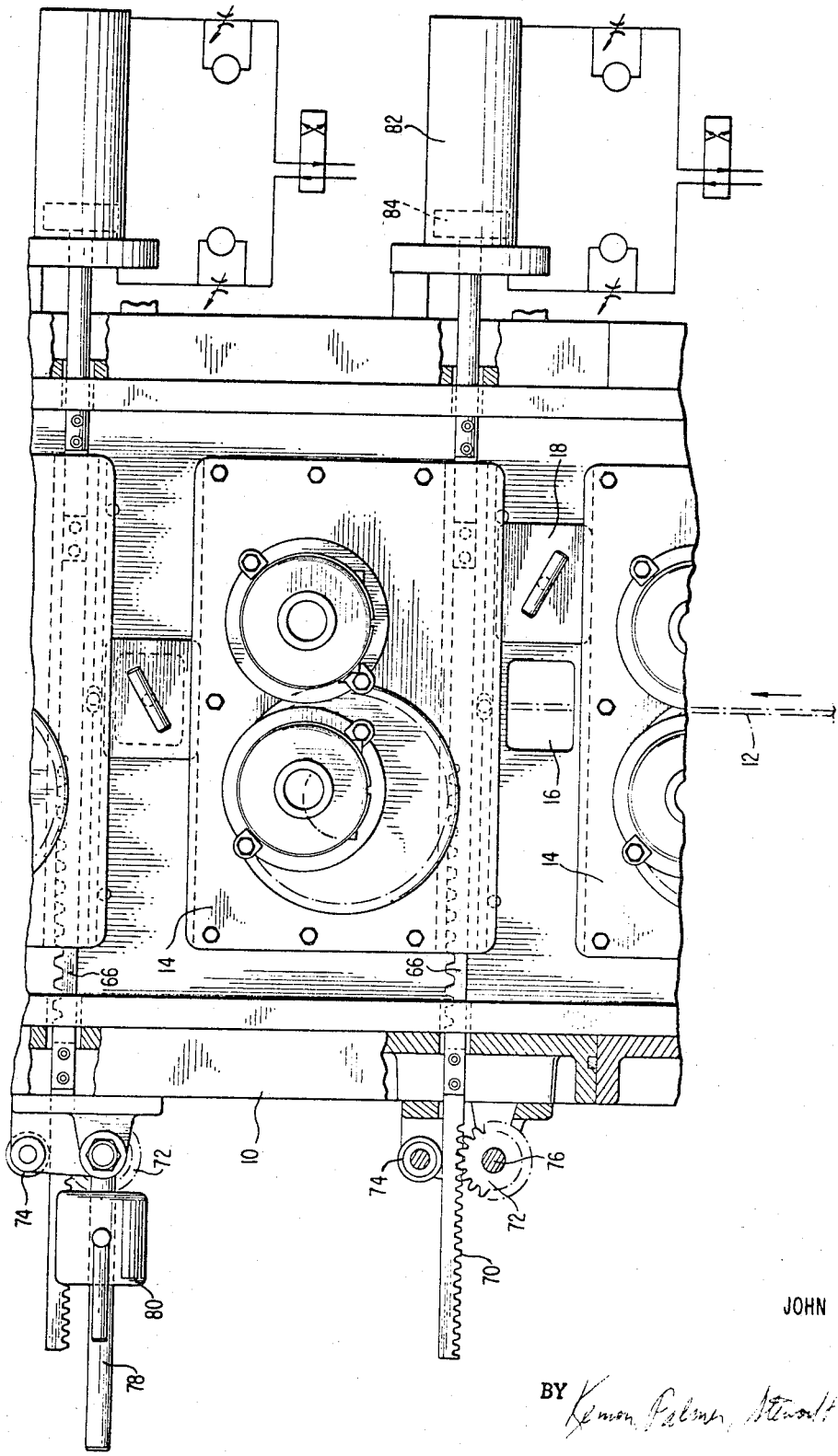
FIG. I
INVENTOR
JOHN MARTIN
BY
ATTORNEY

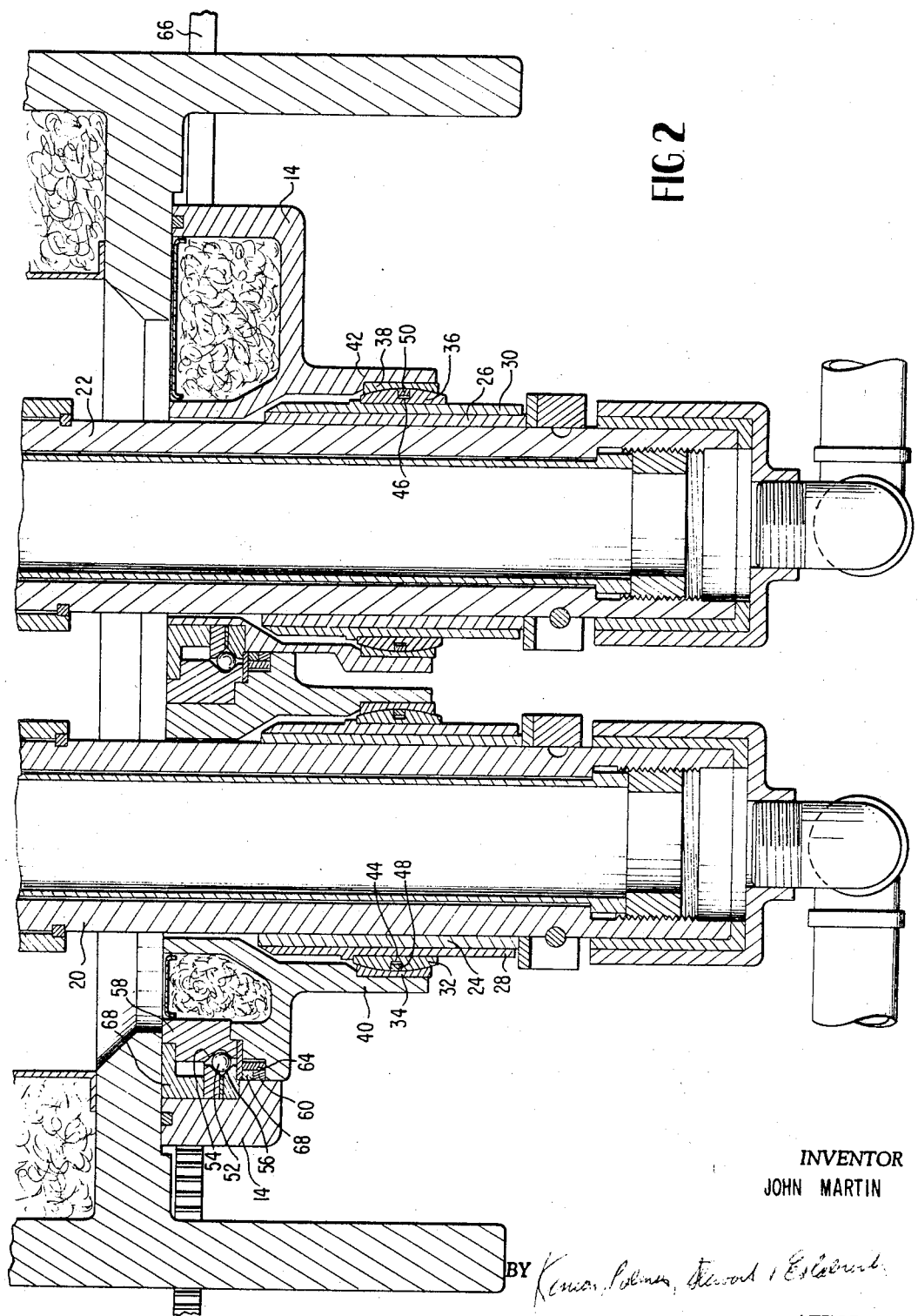

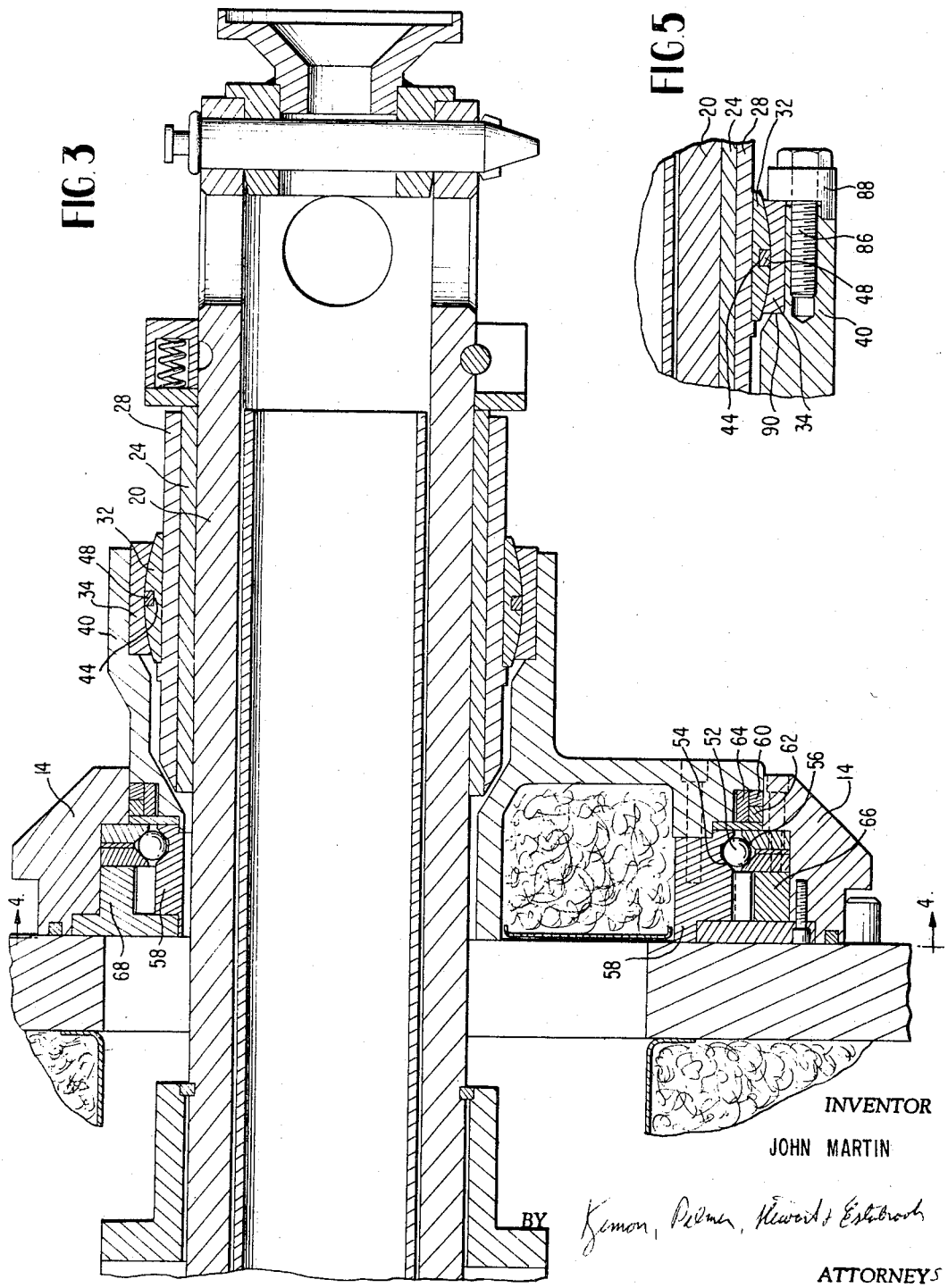

Jan. 7, 1969 J. MARTIN 3,420,651
ROLL BEARING STRUCTURES FOR GLASS MAKING MACHINES
Filed June 7, 1965 Sheet 4 of 4
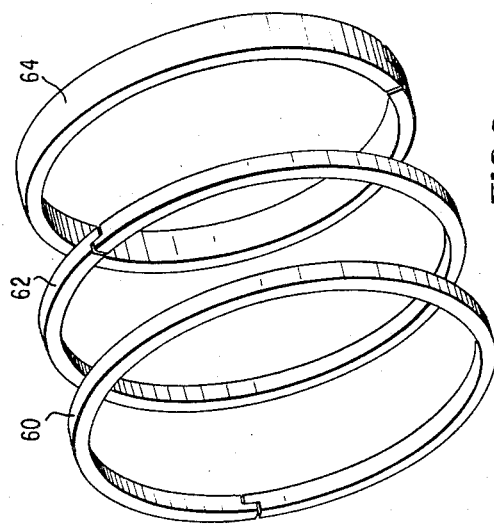
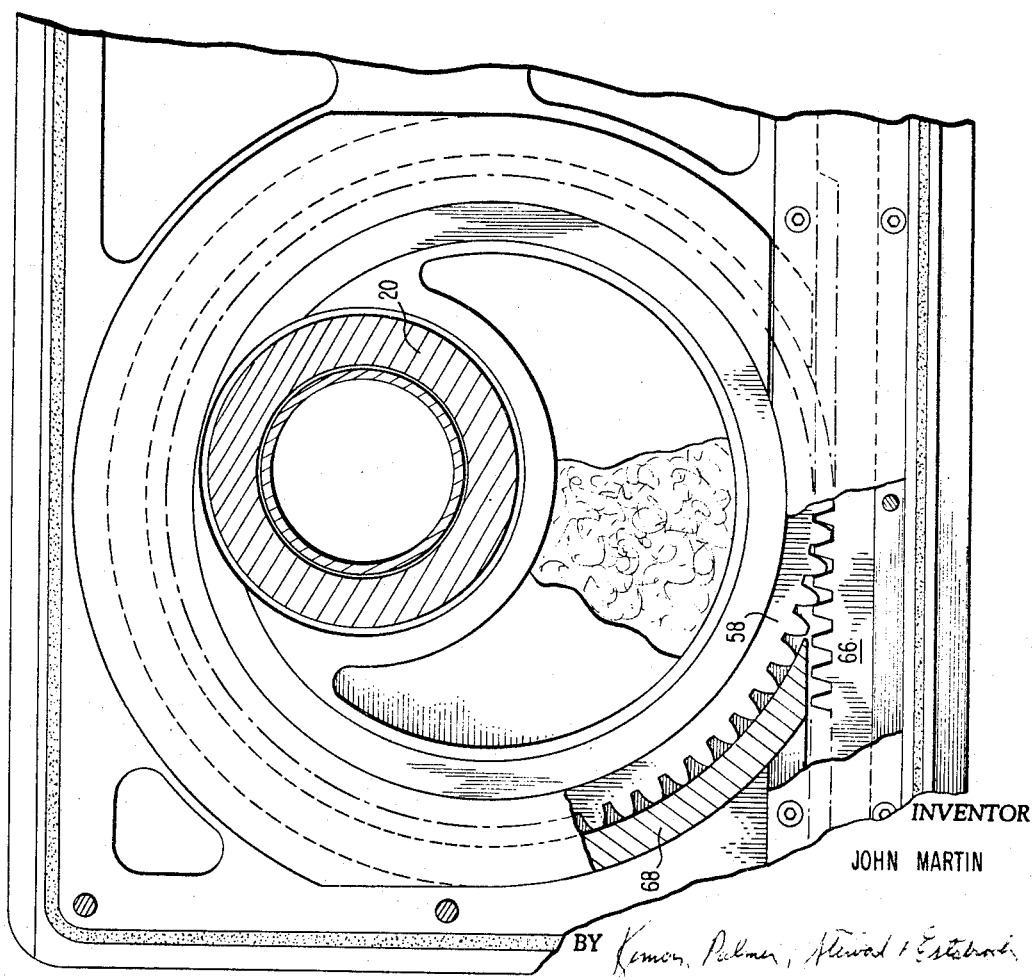
INVENTOR
JOHN MARTIN
BY
ATTORNEYS

United States Patent Office 3,420,651
Patented Jan. 7, 1969

3,420,651
ROLL BEARING STRUCTURES FOR GLASS
MAKING MACHINES
John Martin, Monterrey, Mexico, assignor to Fabricacion
de Maquinas, Monterrey, Nuevo Leon, Mexico, a corporation of Mexico
Filed June 7, 1965, Ser. No. 461,679
U.S. Cl. 65—194      4 Claims
Int. Cl. C03b 15/02

ABSTRACT OF THE DISCLOSURE

A swing roll structure for a vertical draw sheet glass forming and annealing machine is disclosed in which the swing roll is mounted for rotation about its first own axis and also about a second axis spaced from its own and parallel thereto. The bearing structure for the two axes of rotation are hermetically sealed with the side wall of the machine and the swing roll is weight biased about its second axis of rotation toward its paired roll and the glass sheet. Both remote and local control means are provided for quickly rotating the swing roll about its second axis of rotation to effect a fast separation of each roll pair to permit passage of the bait or a stone and a cushioned return to re-contact the glass sheet.

---

This invention relates to glass making machines and more particularly to sheet glass making machines of the so-called vertical draw type. Vertical draw sheet glass making machines include a plurality of pairs of drawing and annealing rolls which are aligned vertically from the top to the bottom of the machine. In normal operation of the machine, these rolls contact opposite sides of the upwardly moving glass sheet in order to positively drive it from the bottom to the top of the machine. The sheet is formed in the lower portion of the machine immediately above the molten bath of glass and the sheet is colled and annealed as it progresses upwardly through the machine.

Sometimes it becomes necessary to quickly increase the distance between the rolls of each pair of rolls as for example when the presence of a stone has been detected in the upwardly moving sheet of glass. If the rolls in each pair can be separated under such conditions, the upwardly moving glass sheet will not fracture. This might otherwise necessitate a shutdown of the machine which is both time consuming and expensive.

Also, when a machine is first started up, the successive roll pairs must be separated from each other in order to permit passage of the bait.

Sheet glass forming machines of the vertical draw type are generally very sensitive to air drafts through the machine created by the chimmney effect of the machine itself should an air leak develop in the lower portions of the machine. For this reason, any mechanical arrangement which is effective to separate the rolls of each pair one from the other must be such that a hermetic seal is effected before, during and after separation of the rolls of any given pair. Inasmuch as the rolls in question are quite large and heavy, it has been a problem in the prior art to provide a roll shifting means for this purpose.

Accordingly, it is the principal object of the present invention to provide what may be termed a swing bearing support for one roll of each pair of rolls in a vertical draw sheet glass making machine.

A further object of the present invention is to provide a mechanism which is easily operated and effective to quickly increase the spacking between the rolls in each pair in a machine of this type.

Other objects will be apparent to those skilled in this art from the following detailed description when read in conjunction with the attached sheets of drawings in which:

FIGURE 1 is an end view of a portion of a vertical draw sheet glass making machine with the swing bearing of the present invention embodied therein;

FIGURE 2 is a horizontal section through one pair of rolls in one section of the machine;

FIGURE 3 is a section similar to FIGURE 2 but in a vertical plane;

FIGURE 4 is an enlarged view of a portion of FIGURE 1 with parts broken away and other parts shown in section;

FIGURE 5 is a detailed view showing a clamping means for one of the roll bearings; and FIGURE 6 is a perspective view of the real rings which are used to create an hermetic seal around portions of the movable roll support structure.

In accordance with the present invention, one roll of each pair of rolls is mounted for rotation not only about its own axis but also about a second axis spaced from its own. The entire bearing structure for rotation of the roll about its own axis rotates with the roll about the second axis. Conveniently, rack and pinion means are utilized to effect the desired mechanical movement and all portions of the bearing structure are substantially hermetically sealed against the entrance of air into the interior of the machine.

Referring first to FIGURE 1 of the accompanying drawings, the machine which is generally indicated by the reference numeral 10 is made up of a plurality of identical sections stacked one on top of the other. Somewhat less than one complete such section is shown in FIGURE 1. The upwardly moving glass sheet is indicated at 12 and lies in a plane which is perpendicular to the plane of this figure. The glass sheet 12 is driven upwardly through the machine by means of a plurality of pairs of rolls which engage opposite sides of the glass sheet. Only the bearing structure covers for these rolls are shown in FIGURE 1. Access to the rolls proper may be had by removing the cover plate 14. One such cover plate overlies each end of each roll pair. Peep openings 16 are provided between each pair of rollers and are positioned to permit visual inspection of the upwardly traveling glass sheet 12. These peep openings are covered by sliding closure members 18 in normal use of the machine.

Turning now to FIGURE 2 which is a horizontal sectional view taken through a pair of rolls, the roll cores are shown at 20 and 22. The actual glass sheet contacting portion of the rolls comprises a stack of highly compressed asbestos board washers but these are not shown in this figure. The rolls 20 and 22 are supported in plain bearings 24 and 26 for rotation about their own axes. The bearing structures 24 and 26 are identical and are duplicated at opposite ends of each roll. Preferably, the bearing members proper 24 and 26 are formed of graphite and the graphite is backed up by steel sleeves 28 and 30 which surround the graphite sleeves 24 and 26. In order to make these bearings self aligning, a pair of gray iron rings 32, 34 and 36, 38 are provided between the steel sleeves 28 and 32 and the outer bearing members 40 and 42 the mating surfaces between rings 32, 34 and 36, 38 are curvilinear as shown the outer curved surface of the rings 32 and 36 each include annular grooves 44 and 46 housing sealing rings 48 and 50 which are effective to create a substantially hermetic seal between the members 32, 34 and 36, 38.

The roll 20 together with its complete bearing structure described above is also mounted for rotation on an axis spaced from the axis of the roll itself in order to permit the roll 20 to be separated from the roll 22 whenever the operation of the machine requires such separation. This additional bearing structure includes a ball type bearing, the balls being indicated at 52 and received between inner and outer races 54 and 56 respectively. The inner race 54 is formed in a member 58 which member is actually an external ring gear or pinion and is carried by the outer bearing member 40. In order to provide further hermetic sealing against the entry of outside air into the interior of the machine surrounding the ball bearing 52, three piston type rings 60, 62 and 64 are provided between the outer bearing member 40, the cover plate 14 and the bearing proper. The rings 60 and 62 abut each other in axial alignment and the ring 64 is concentrically disposed with respect to 60 and 62 and overlies the abutting surfaces of the rings 60 and 62. These rings are shown in perspective view in FIGURE 6 to illustrate the circumferential staggering of the joints in each ring with respect to the others.

The entire bearing structures thus far described are duplicated at the opposite ends of the rolls as shown most clearly in FIGURE 3 which is a section through the roll 20 in a plane which is at 90° with respect to the section of FIGURE 2. That end of the roll 20 shown in FIGURE 3 is the driven end although the specific driving mechanism is not shown.

From the foregoing description it will be apparent that the roll 20 is mounted for rotation about its own axis in a plane bearing and about an axis spaced from its own axis in a roller bearing structure. Since the external ring gear or pinion 58 is rigidly attached to the outer plane bearing member 40, rotation of the ring gear 58 will be effective to move the entire roll 20 about an axis which passes through the center of the ring gear 58 and which rotation is effective to separate the roll 20 from the roll 22 when rotated in one direction and to bring the roll 20 closer to the roll 22 when rotated in the opposite direction.

FIGURE 4 is an enlarged sectional view showing a rack member 66 meshing with the ring gear 58. The rack 66 is slidably mounted between the front of the machine and the inside of the cover plate 14. As shown most clearly in FIGURE 4, there is a shield member 68 which closely surrounds the ring gear 58. This shield 68 extends substantially completely around the periphery of the ring gear but terminates as shown most clearly in FIGURE 4 at a point where the teeth of the ring gear and the teeth of the rack begin to engage with each other. The relative positions of these parts is also shown in FIGURE 3 which is a vertical section. As shown most clearly in this figure, the rack 66 is positioned behind the ball bearing structure and slides on a horizontal surface of the cover plate 14.

FIGURE 1 shows a preferred mechanism for reciprocating the racks 66. At the left hand extremities of the racks a further series of rack teeth are provided on the underside of each rack as indicated at 70 and these teeth engage with a small pinion gear 72. Positioned above the pinion gear 72, vertically aligned therewith and engaging the opposite surface of the rack 66 is an idler or guide roller 74. The pinion 72 is rigidly attached to a shaft 76 for rotation therewith. Connected to the shaft 76 is an operating arm 78 which arm carries an adjustable counterweight 80. When it is desired to effect separation between the rolls of any given pair therefore, the operator merely rotates the arm 78 in a clockwise direction which rotates the pinion 72 in the same direction and causes the rack 66 to move to the right as shown in FIGURE 1. Movement of the rack to the right as shown in FIGURES 1 and 4 effects counter clockwise rotation of the pinion gears 58 and thus the entire roll 20 and its bearing structure is rotated about the axis of the pinion gears 58. Due to the size and weight of the rolls invloved, the rack and pinion structure is preferably duplicated on opposite ends of each roll pair so that they may be simultaneously operated on opposite sides of the machine.

Also shown in FIGURE 1 is a hydraulic cylinder 82 having a piston 84 therein said piston being attached to the opposite end of the rack 66. Obviously, suitable valving which is schematically illustrated in FIGURE 1 can be used to produce power actuated movement of the racks 66. Additionally, if the racks 66 are to be hand operated by means of the arms 78, the hydraulic cylinders 82 will serve as dash pots which cushion the movement of the parts involved.

FIGURE 5 merely shows an enlarged detail of the clamping means for each roll. The clamping means for the plane bearings for each roll. The particular clamping means shown consist simply of a threaded bolt 86 which engages with a tapped hole in the member 40 and through the medium of a washer 88 which engages the outer surface of the ring 34 and holds the member 34 against the shoulder 90 formed in the member 40.

While a preferred embodiment of the present invention has been herein shown and described, applicant claims the benefit of a full range of equivalents within the scope of the appended claims.

I claim:

1. In a sheet glass drawing machine of the vertical draw type including a plurality of pairs of drawing and annealing rolls which form and advance the glass sheet through the machine, means for swinging one roll of each pair away from its paired roll comprising:
   (a) first bearing means positioned at opposite ends of one roll of each pair supporting said one roll for rotation about its own axis;
   (b) second bearing means at opposite ends of said one roll supporting said roll and said first bearing means for rotation about an axis spaced from the axis of said one roll;
   (c) means sealing said first bearing means against the entrance of air into the interior of the machine;
   (d) means sealing said second bearing means against entrance of air into said machine;
   (e) and means for effecting rotation of said one roll and first bearing means to separate said one roll from its paired roll a predetermined distance.

2. In a sheet glass drawing machine of the vertical draw type including a plurality of pairs of drawing and annealing rolls which form and advance the glass sheet through the machine, means for swinging one roll of each pair from its impaired roll comprising:
   (a) first bearing means positioned at opposite ends of one roll of each pair supporting said one roll for rotation about its own axis;
   (b) second bearing means at opposite ends of said one roll supporting said one roll and said first bearing means for rotation about an axis spaced from the axis of said one roll;
   (c) and means for effecting rotation of said one roll and first bearing means to separate said one roll from its paired roll a predetermined distance.

3. Apparatus as defined by claim 2 in which said last mentioned means comprises a pinion gear eccentrically surrounding and rigidly attached to the outer bearing member of said first bearing means; a slidable rack engaging with said pinion; and means for reciprocating said rack to rotate said one roll about an axis corresponding to the axis of said pinion.

4. Apparatus as defined by claim 3 including remote control hydraulic means for reciprocating said rack and for cushioning the return of said roll to its original position.

References Cited

UNITED STATES PATENTS

| | | | |
|---|---|---|---|
| 1,838,305 | 12/1931 | Genenger | 65—253 X |
| 1,872,587 | 8/1932 | Henderson | 65—196 |
| 3,165,391 | 1/1965 | Schmid | 65—95 X |
| 3,181,392 | 5/1965 | Brand | 65—193 X |

DONALL H. SYLVESTER, *Primary Examiner.*

F. W. MIGA, *Assistant Examiner.*

U.S. Cl. X.R.

65—95, 159, 254, 32.